June 29, 1954 M. S. DOVBERG 2,682,431
VEHICLE SAFETY WHEEL
Filed Aug. 17, 1948
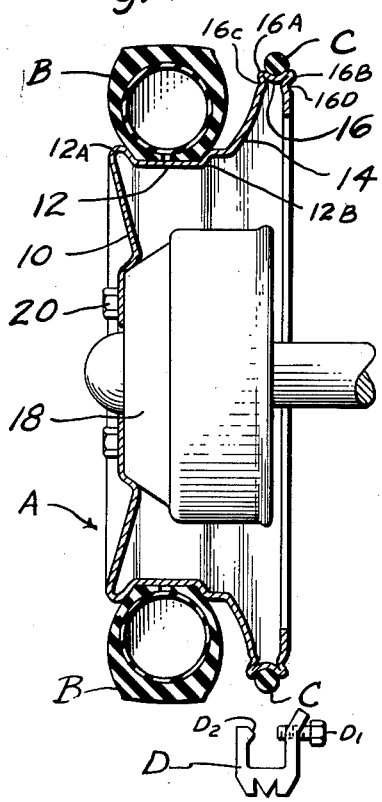
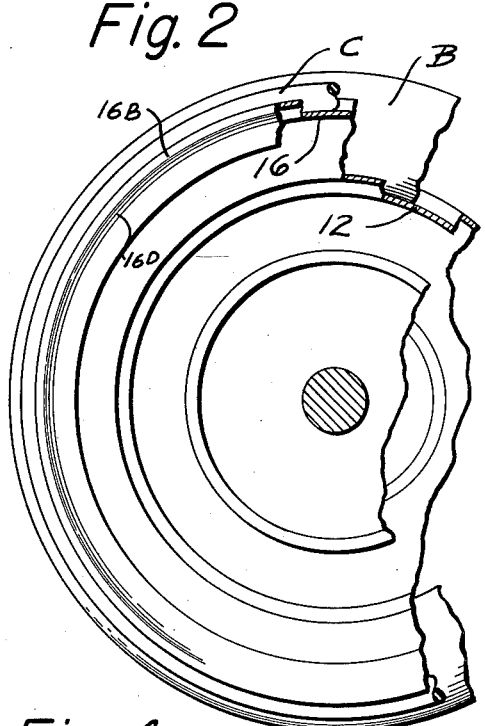
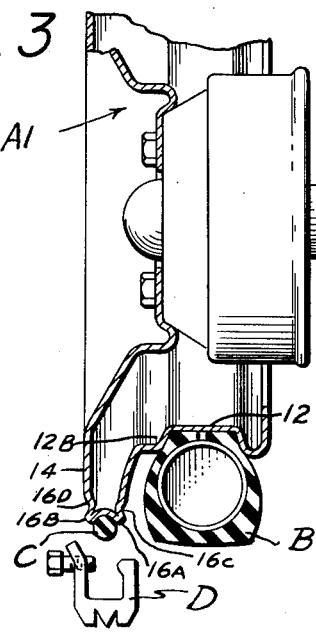
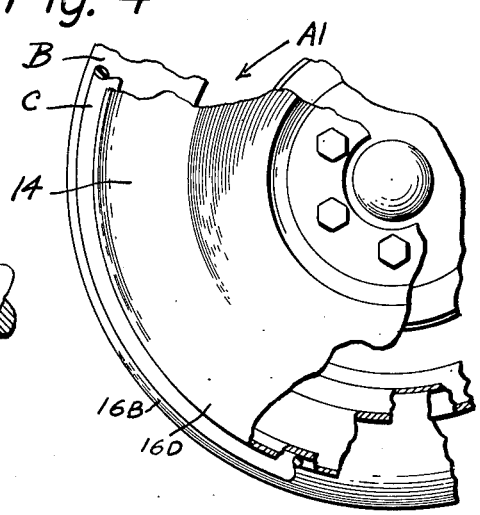
INVENTOR.
MAURICE S. DOVBERG
BY
Harry Langsam
ATTORNEY Patented June 29, 1954

2,682,431

UNITED STATES PATENT OFFICE 2,682,431

VEHICLE SAFETY WHEEL

Maurice S. Dovberg, Philadelphia, Pa.

Application August 17, 1948, Serial No. 44,709

5 Claims. (Cl. 301—39)

My invention relates to a rim and relates particularly to a safety rim for automobiles, trucks, land-flying aeroplanes, busses, tractors, or any other type of wheeled vehicles.

Heretofore, wheeled vehicles such as the automobiles and the landing gear of airplanes have pneumatic tires which carry a second or inner thin tube that is filled with air for easy riding. During the movement of the vehicle at relatively high speeds the blowing out of the air in the inner tube results in a deflated tire and loss of control of the vehicle which may result in loss of life or of property.

Furthermore, in tractors, vehicles, at times, need for added traction is required.

It, therefore, is an object of my invention to provide an auxiliary rim for each vehicle wheel adapted to contact the ground in the event that the tire on the rim to which the auxiliary rim is attached, becomes deflated.

Another object of my invention is to provide an auxiliary rim which provides traction in the event the tire on the main rim sinks into soft ground or mud, the construction being such that the auxiliary rim is well off the ground as long as the tires are inflated and the main wheels do not sink into the mud.

Another object is the thickness of the vulcanized rubber on the outside rim-wheel portion will enable the wheel to ride against curbs without causing damage.

Another object of my invention is to provide a single stamped out rim which is able to take the customary pneumatic tire and the auxiliary tire.

Another object of my invention is to provide an auxiliary rim for each main wheel which may take or bear a portion of the overload applied to a vehicle.

Another object of my invention is to provide an auxiliary rim for each main wheel which auxiliary rim-wheel may be placed upon the outside or the inside of the main rim.

Other objects of my invention are to provide a strong, durable, and compact auxiliary rim for vehicles which shall be relatively inexpensive to manufacture, which shall be easy to mount and demount, and which is practical and effective to a high degree.

Fig. 1 is a fragmentary front view of a vehicle wheel embodying an auxiliary rim of my invention.

Fig. 2 is a fragmentary side view of the rim as shown in Fig. 1.

Fig. 3 is a fragmentary front view of a modification of my invention wherein the auxiliary rim-wheel is placed on the outside of the regular rim.

Fig. 4 is a side view of the rim shown in Fig. 1.

Referring now in greater detail to the drawing wherein similar reference characters refer to similar parts I show a vehicle rim, generally designated as A, of the type having a pneumatic tire, generally designated as B, mounted on the rim base A, embodying my invention. The rim base A has provision for a second or auxiliary tire, generally designated as C, which is a rim-wheel of solid rubber or of synthetic rubber. The outside diameters of the tires B and C are different since the tire C does not engage the ground unless the main tire B is deflated to an abnormal extent or if high ground is encountered or if the main tire B sinks into mud or snow or ice.

The rim A of a special construction has an annular disc 10 with a flange 12 at substantially right angles whereby the pneumatic tire B is mounted. The flange 12 is located flush between two slight raised portions 12A and 12B which serve to prevent the automobile tire B from being pushed off the flange by the concussion of blowouts. From the flange 12 is a continuation 14 which extends upwardly to another smaller flange 16 upon which is mounted the solid auxiliary tie C. The flange 16 is concave in cross section and its edges are defined by beads 16A and 16B. Beside the bead 16A is a slight recess 16C which is formed around the rim and beside the bead 16B is a slight recess 16D.

The disc 10 is adapted to be attached to a brake drum 18 by means of suitable holding bolts 20 so that both the main tire B as well as the auxiliary tire C rotate in unison. A suitable hub cap may be attached to add a decorative effect to the wheel.

It should be particularly noticed that the rim is made of a single stamping and that it may be removed in the customary manner, furthermore the vehicle need not be specially constructed to take my rim.

In Fig. 3 I show a modification of my invention wherein the rim A has the auxiliary rim-wheel C placed on the outside of the main tire B. This construction may be desirable where a clamp D is to be placed on the auxiliary rim-wheel for added traction as on the farm, for military use, airfields, or in snowdrifts. The clamp D is U-shaped in cross section with a bolt D1 through one leg and an inward projection D2 on the other leg. The bolt D1 is adapted to have one end fit into the recess 16D and the projection D1 rests within the recess 16C thereby locking the clamp D firmly to the rim.

It should be observed that when the vehicle is running on the normal hard surface road the auxiliary or subordinate rim-wheel C does not come in contact with the ground unless the main tire is deflated and under such conditions the auxiliary rim-wheel comes in contact with the ground and serves to roll or carry the load.

In the event the vehicle runs in mud or upon soft ground and the main tire sinks into the ground then the auxiliary tire will contact the mud or soft ground and add traction to the vehicle.

In Fig. 4 the entire outside portion of rim-wheel shown as 14 will be finished with ultra modern decoratives such as stainless steel or chrome finishes, white enamel, to take the place of white walled tires or accessories, plastic coat in decorative colors, porcelain baked on metal with contrasting and harmonious colors, etc. Such finish will add beauty and contrast to the decorative designs of all modern tire wheeled vehicles. When the rim-wheel C is on the outside it will also save the tires by preventing the side of the tires from rubbing or pinching against curbs, thus avoiding unnecessary flat tires and destruction of tire walls.

The clamps D on the rim-wheel may be used after partially deflating the tires so that the tires and the cleats come to rest evenly while driving in rain, snow, or ice (glassy) highways or streets, this will reduce driving hazards, accidents and avoid unnecessary loss of life and limb.

Although my invention has been described in considerable detail such description is intended to be illustrative of the invention since it may be variously embodied, and while I have described a certain definite pattern and construction to produce a safety-rim having a safety-rim-wheel and an excellent traction, safety-clamp-U-shaped and M treaded, it should be understood that this invention is capable of employment for any purpose which analogous wheeled vehicles that travel on land and wheeled vehicles that travel the airways, having rims, rim-wheels, traction clamps, safety-clamps, non-skidding and non-sideswiping clamps for such vehicles, and that the right is also reserved to make all such changes and modifications in the pattern, the structure, the dimensions, the material composition and the use of same as will constitute no departure from the spirit of the invention or the scope of the claims hereunto appended.

I claim:

1. A safety wheel for an automotive vehicle in the form of a unitary, one-piece structure comprising an annular disk adapted for securement to an axle-supported brake drum of the vehicle, said disk having a circumferentially continuous flanged part of which portions are radially offset to provide a pair of laterally spaced, coaxial tire-bearing rims of relatively different diameters, each of said rims being shouldered at opposite sides thereof to provide a circumferentially continuous recessed seat for a tire, the rim of smaller diameter being adapted to seat thereon a conventional pneumatic tire and the rim of larger diameter a solid rubber tire, the diameters of the two rims and the sizes of the two tires being relatively such that the overall outside diameter of the solid tire assembly is less than that of the pneumatic tire assembly when said pneumatic tire is operatively inflated, the solid tire rim portion of the wheel being channel shaped to provide a pair of opposed side flanking walls which extend radially inwardly of the rim for the solid tire, said walls being respectively circumferentially indented in the regions thereof immediately adjoining said rim to strengthen and rigidify the same and to provide means for interlocking securement with the rim of a plurality of circumferentially spaced traction cleats.

2. In a safety wheel as defined in claim 1 wherein said solid tire rim is disposed upon the outer side of the pneumatic tire assembly and wherein the outer flanking wall thereof extends radially inwardly toward the brake-drum for securement thereto, said outer flanking wall of the solid tire rim and radial extension serving as a protective shield for the pneumatic tire assembly.

3. In a safety wheel as defined in claim 1, the combination therewith of a plurality of ground-engaging traction cleats spaced circumferentially about the solid rubber tire assembly thereof, each of said members being U-shaped to provide a pair of laterally spaced elements which respectively externally overlie the opposed side flanking walls of said solid rubber tire assembly and are respectively provided with parts which seat in said indentations formed in said solid tire rim for interlocking securement of said traction members thereto.

4. In a safety wheel as defined in claim 1, the combination therewith of a plurality of ground-engaging traction cleats spaced circumferentially about the solid rubber tire assembly thereof, each of said cleats being U-shaped to provide a part which extends transversely across the solid rubber tire and a pair of laterally spaced elements which respectively externally overlie the opposed side flanking walls of said solid rubber tire assembly, said cleats being each further provided with parts which seat in said indentations formed in said solid tire rim for interlocking securement of said traction cleats thereto, one of said interlocking parts being in the form of an integral projection on the inner face of one of said laterally spaced elements and the other of said interlocking parts being in the form of an axially shiftable member threaded into the other of said laterally spaced elements, said part of the cleat which extends transversely across the solid rubber tire being externally serrated.

5. In a safety wheel as defined in claim 1, the combination therewith of a plurality of ground-engaging traction members spaced circumferentially about the solid rubber tire assembly thereof, each of said members being U-shaped to provide a pair of laterally spaced elements which respectively externally overlie the opposed side flanking walls of said solid rubber tire assembly and are respectively provided with parts which seat in said indentations formed in said solid tire rim for interlocking securement of said traction members thereto, one of said interlocking parts being in the form of an integral projection on the inner face of one of said laterally spaced elements and the other of said interlocking parts being in the form of an axially shiftable member threaded into the other of said laterally spaced elements, said integrally formed part, when engaged in its accommodating indentation, serving as a fulcrum about which the traction member may be swung into position to operatively embrace the solid tire and its supporting rim.

References Cited in the file of this patent

UNITED STATES PATENTS

| Number | Name | Date |
|---|---|---|
| 1,404,802 | Spicer | Jan. 31, 1922 |
| 1,458,937 | Hart | June 19, 1923 |
| 2,228,423 | Ticktin et al. | Jan. 14, 1941 |

FOREIGN PATENTS

| Number | Country | Date |
|---|---|---|
| 623,105 | France | June 16, 1927 |
| 261,089 | Italy | Nov. 6, 1928 |